United States Patent
Yao et al.

(10) Patent No.: US 6,738,699 B2
(45) Date of Patent: May 18, 2004

(54) VEHICLE STEERING SYSTEM CONTROL BASED ON A MODEL-MATCHING STRATEGY

(75) Inventors: Yixin Yao, Ann Arbor, MI (US); Behrouz Ashrafi, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/228,224

(22) Filed: Aug. 26, 2002

(65) Prior Publication Data

US 2004/0039507 A1 Feb. 26, 2004

(51) Int. Cl.$^7$ .............................. G06F 19/00; B62D 5/04
(52) U.S. Cl. ............................. 701/41; 701/42; 180/446
(58) Field of Search ...................... 701/41, 42; 180/446, 180/402, 403, 421, 422

(56) References Cited

U.S. PATENT DOCUMENTS

| | | | |
|---|---|---|---|
| 4,706,771 A | 11/1987 | Kawabe et al. | 180/415 |
| 4,718,685 A | 1/1988 | Kawabe et al. | 180/415 |
| 5,704,446 A * | 1/1998 | Chandy et al. | 180/446 |
| 5,742,918 A | 4/1998 | Ashrafi et al. | 701/70 |
| 5,742,919 A | 4/1998 | Ashrafi et al. | 701/70 |
| 5,787,375 A | 7/1998 | Madau et al. | 701/41 |
| 5,790,966 A | 8/1998 | Madau et al. | 701/41 |
| 5,809,434 A | 9/1998 | Ashrafi et al. | 701/1 |
| 5,908,457 A | 6/1999 | Higashira et al. | 701/41 |
| 5,971,782 A | 10/1999 | Masuda | 439/164 |
| 6,122,568 A | 9/2000 | Madau et al. | 701/1 |
| 6,185,485 B1 | 2/2001 | Ashrafi et al. | 701/1 |
| 6,314,329 B1 | 11/2001 | Madau et al. | 700/89 |
| 6,408,687 B1 | 6/2002 | Ashrafi et al. | 73/118.1 |
| 2002/0070070 A1 | 6/2002 | Andonian et al. | |
| 2002/0079155 A1 | 6/2002 | Andonian et al. | |
| 2002/0129988 A1 | 9/2002 | Stout et al. | |
| 2002/0144855 A1 | 10/2002 | Zheng et al. | |

FOREIGN PATENT DOCUMENTS

| | | |
|---|---|---|
| EP | 0 775 624 A2 | 5/1997 |
| EP | 0 775 624 A3 | 8/1998 |
| EP | 1 110 845 A1 | 6/2001 |
| EP | 1 110 846 A1 | 6/2001 |
| EP | 1 211 159 A1 | 6/2002 |
| WO | WO 99/58390 | 11/1999 |
| WO | WO 00/28405 | 5/2000 |

OTHER PUBLICATIONS

Y.X. Yao et al., "Functional Observer and State Feedback for Input Time–Delay Systems," Int. J. Control, vol. 66, No. 4, 1997, pp. 603–617, (month is not available).

Zongxuan Sun, "Control of Linear Systems with Nonlinear Disturbance Dynamics," Proceedings of the American Control Conference, Jun. 25–27, 2001, pp. 3049–3054.

Pending patent application Assigned to Visteon Global Technologies, Inc.: Ser. No.: 10/037,059, Filing Date: Dec. 31, 2001, Inventor: Yao et al.

Pending patent application Assigned to Visteon Global Technologies, Inc.: Ser. No.: 10/037,060, Filing Date: Dec. 31, 2001, Inventor: Stout et al.

* cited by examiner

*Primary Examiner*—Tan Q. Nguyen
(74) *Attorney, Agent, or Firm*—Brinks Hofer Gilson & Lione

(57) ABSTRACT

A steer-by-wire control system that includes a road wheel actuation control system controlling road wheel angles to track a road wheel reference angle and a steering wheel control system producing a steering wheel angle to the road wheel actuation control system, steering feel for the vehicle driver and active steering wheel return. The steering wheel control system further including a steering wheel model matching controller that receives an input signal from the steering wheel control system and an input signal from the road wheel control system and generates a control output signal based on a model-matching control law, wherein the control output signal controls a reaction torque of the steering wheel control system to produce the steering feel for the driver and control the return rate of a steering wheel or a joystick.

27 Claims, 3 Drawing Sheets

Fig. 1 PRIOR ART

VEHICLE STEERING SYSTEM CONTROL BASED ON A MODEL-MATCHING STRATEGY

BACKGROUND OF THE INVENTION

1. Field of Invention

The present invention relates generally to a steering system for a vehicle and more particularly to a vehicle steer-by-wire control system using a model-matching strategy.

2. Discussion of Related Art

In a steer-by-wire control system, the traditional steering column, steering shaft, and steering gear are replaced by an electronically controlled actuation system. The actuation system receives a steering command from a controller and accordingly turns the front road wheels using an electric motor. The vehicle driver provides the steering command through a steering wheel control system using a steering wheel or a joystick. As part of a steer-by-wire control system, a steering wheel control system with a force feedback motor actuator provides the direction reference signal for the road wheel actuation system and the familiar steering feel experienced in the conventional steering systems with a mechanical connection. Such a steer-by wire control system can improve a vehicle's handling performance and stability by providing new features such as adjustable driver steering feel, variable steering effort, variable steering ratio, and active steering wheel return.

FIG. 1 schematically shows a typical steer-by-wire control system 100. As shown in FIG. 1, the steer-by-wire control system 100 includes a steering wheel unit 102, a road-wheel actuation unit 104 and a controller 106. The steering wheel unit 102 includes a steering wheel 108 that is actuated by the driver, a steering wheel angle sensor 110, a steering wheel actuator 112 with electric motor, a motor amplifier 114 and a steering column and connecting shaft 116. The road-wheel actuation unit 104 includes one or more road wheels 118, a road wheel actuator 120 with electric motor, a motor amplifier 122 and a road wheel angle sensor 124. Typically, there are two road wheels 118, one or two road wheel actuators 120 or one or two road wheel angle sensors 124.

The controller 106 controls the steering wheel unit 102 and the road-wheel actuation unit 104 via control algorithms that are implemented in the controller 106. In this system, the required steering functions are realized by using various control system design techniques. In current steer-by-wire control systems, driver's steering feel is realized by controlling the reaction torque of a DC electric motor actuator 112 attached to the steering wheel 108. Typically, this reaction torque is a function of the steering wheel angle, vehicle speed, and road wheel torque (wheel's self-aligning moment). It is a challenge for a control system designer to realize the required steering feel by controlling the reaction torque. In addition, in current steer-by-wire control systems, the steering feel and all other steering functions, such as steering wheel returnability, are coupled together. In other words, the controller parameters that affect the steering feel also influence the steering wheel returnability. This coupling between various controlled variables makes the design of a control system and tuning of the controller parameters very difficult and challenging.

BRIEF SUMMARY OF THE INVENTION

A first aspect of the present invention regards a steer-by-wire control system that includes a road wheel actuation control system controlling road wheel angles to track a road wheel reference angle and a steering wheel control system producing a steering wheel angle to the road wheel actuation control system, steering feel for the vehicle driver and active steering wheel return. The steering wheel control system further including a steering wheel model matching controller that receives an input signal from the steering wheel control system and an input signal from the road wheel control system and generates a control output signal based on a model-matching control law, wherein the control output signal controls a reaction torque of the steering wheel control system to produce the steering feel for the driver and the return rate of a steering wheel or a joystick.

In a variation of the first aspect of the invention, the model matching controller has two degrees of freedom and receives a steering wheel angle signal and a road wheel torque signal.

A second aspect of the present invention regards a method of designing a steering wheel model matching controller using a model-matching control methodology. The design of the steering wheel model matching controller requires a reference steering dynamic model which provides a relationship between a steering wheel torque and a steering wheel angle. This reference steering model is representative of a relationship between a steering wheel reaction torque and a steering wheel angle which is applied as a typical evaluation for the steering feel. On the other hand, the steering wheel control system with the steering wheel model matching controller is designed as a closed-loop control system with the steering wheel angle as output and the steering wheel torque as input. With same input and output variables, the steering wheel control system matches the reference steering dynamic model using the different minimization criterions in the model-matching control design such that the steering wheel model matching controller is obtained by minimizing the error between the reference steering model and the steering wheel control system.

In a variation of the second aspect of the invention, the model matching controller with two degrees of freedom is determined using $H_\infty$ norm-based minimization criterion Each aspect of the present invention provides the advantage of improving a driver's steering feel, and the active steering wheel returnability.

Each aspect of the present invention provides the advantage of improving stability of a closed loop control system.

Each aspect of the present invention provides the advantage of improving the robustness of a steer-by-wire control system to disturbances and system parameter variations.

Each aspect of the present invention provides the advantage of adjusting parameters of a two-degree-of-freedom steering wheel model matching controller independently for improving the steering feel and steering wheel returnability.

Each aspect of the present invention provides the advantage of controlling the feel and rate of return of a steering wheel or joystick independently of one another.

Additional embodiments and advantages of the present invention will become apparent from the following description and the appended claims when considered with the accompanying drawings.

BRIEF DESCRIPTION OF THE DRAWINGS

FIG. 1 schematically shows an embodiment of a known steer-by-wire control system;

DETAILED DESCRIPTION OF THE INVENTION

Figure 1:
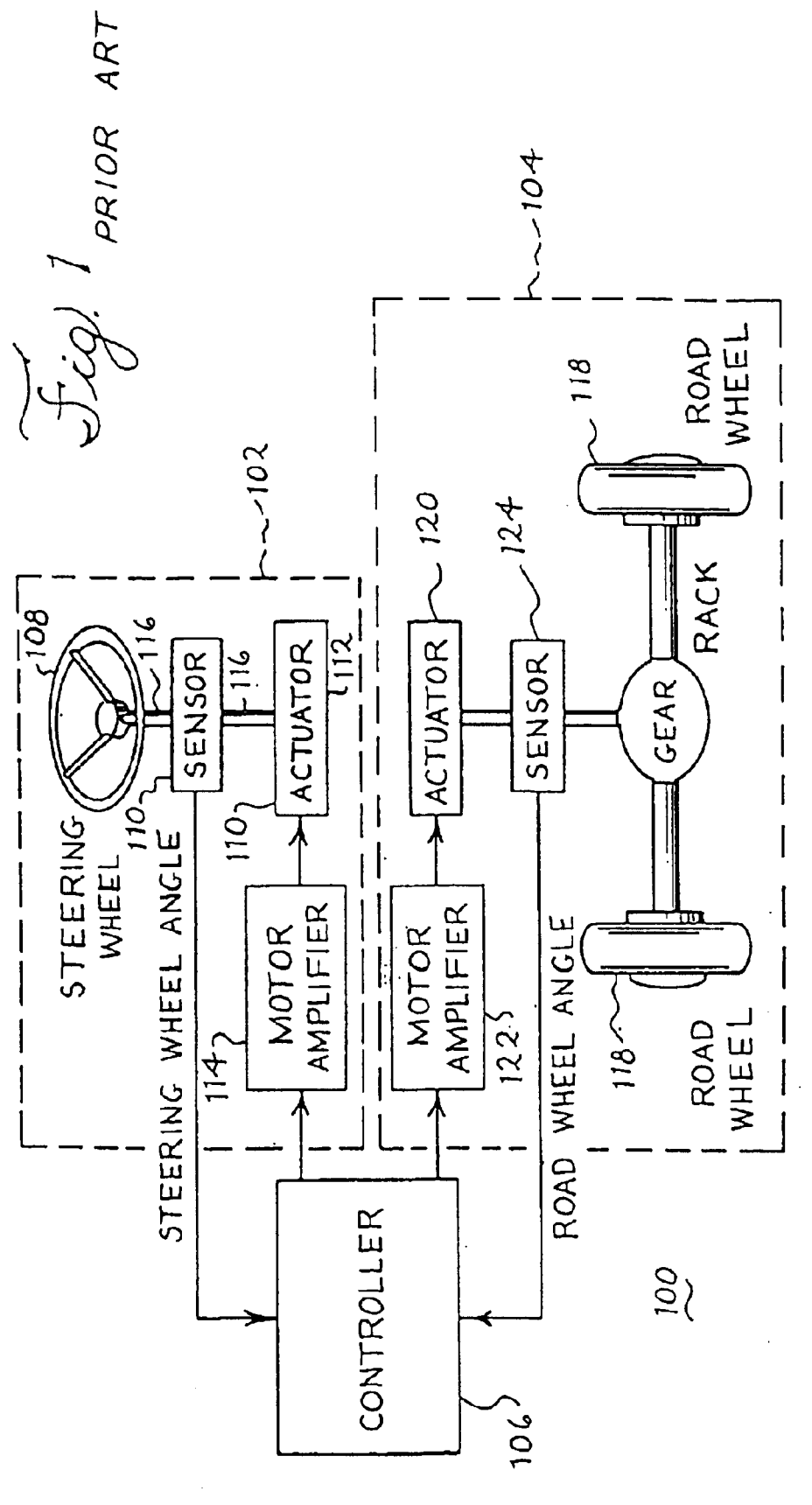
Figure 2:
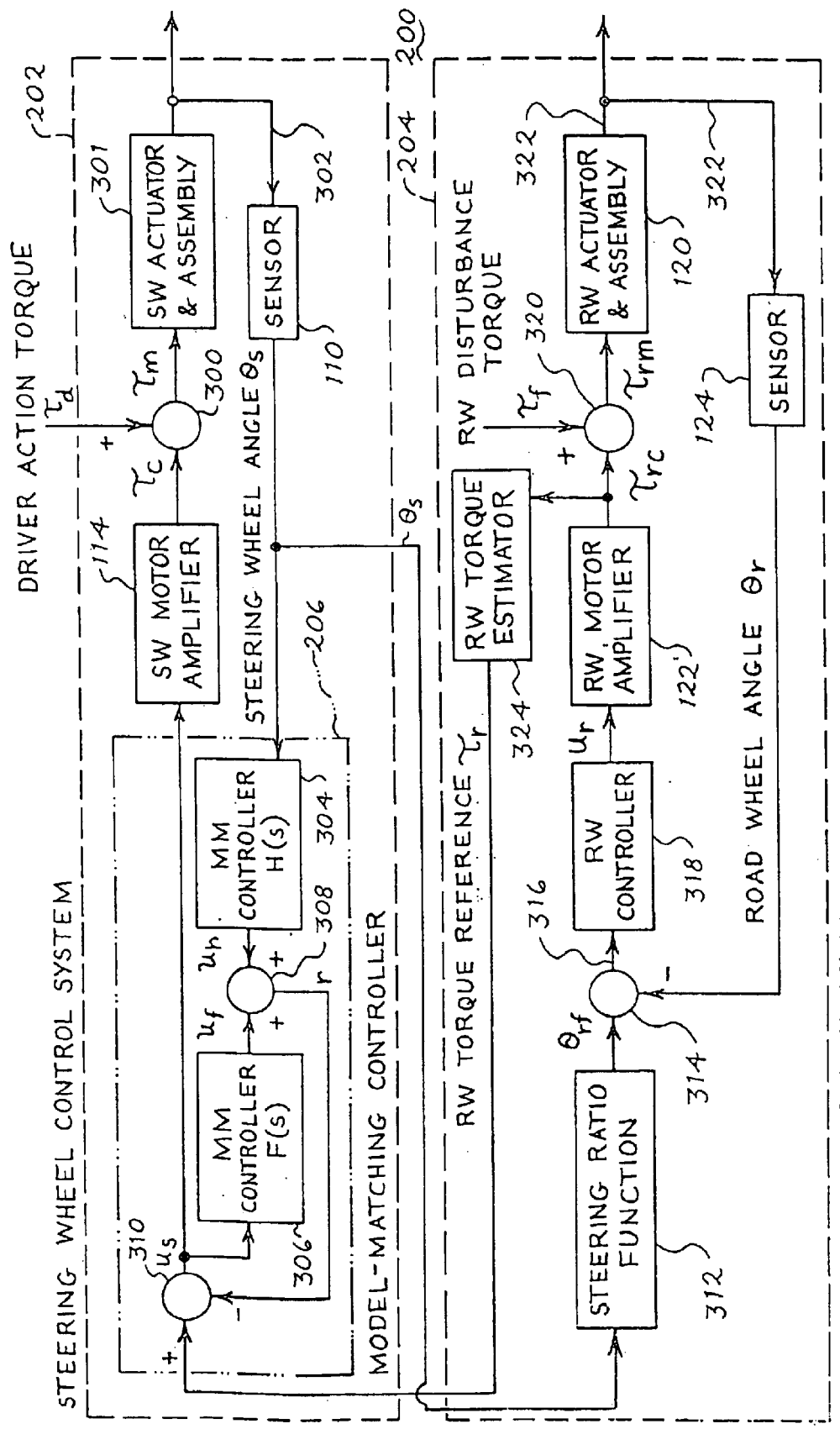
FIG. 2 shows a block diagram of an embodiment of a steer-by-wire control system with two-degree-of-freedom steering wheel controller according to the present invention.

As mentioned previously, FIG. 1 schematically shows a known steer-by-wire system 100. As shown in FIG. 1, the steer-by-wire control system 100 includes a road-wheel actuation unit 104 and a steering wheel unit 102 and their controller 106. The road-wheel actuation unit 104 includes one or more road wheels 118, a road wheel actuator 120 with an electric motor, a motor amplifier 122 and a road wheel angle sensor 124. Typically, there are two road wheels 118, one or two road wheel actuators 120 or one or two road wheel angle sensors 124.

The steering wheel unit 102 includes a manual steering mechanism, such as a joystick or steering wheel 108 that is actuated by the driver; a steering position sensor such as a steering wheel angle sensor 110 attached to the steering wheel via a steering column and connecting shaft 116; a steering wheel actuator 112 with an electric motor; a motor amplifier 114 that contains the power-electronics that drive the steering wheel actuator 112; and a shaft 116 connecting the steering wheel 108, the actuator 112, and the steering wheel angle sensor 110. The steering wheel angle sensor 110 measures the angular position of the steering wheel 108. The steering wheel actuator 112 provides a torque to the steering wheel 108 that generates a desired steering feel for the driver.

The controller 106 provides the control commands for the steering wheel unit 102 and the road-wheel actuation unit 104 such that the required steering functions are achieved. The related part in controller 106 controls the steering wheel unit 102 to produce the steering feel for the vehicle driver, the active return when the vehicle driver releases the steering wheel, and the road wheel angle reference command to the road wheel unit. Thus, the steering wheel unit 102 and its related part in controller 106 (steering wheel controller) compose the steering wheel control system. Controller 106 also controls the road wheel actuation unit 104 such that the road wheels follow and track a desired road-wheel angle reference command generated by the steering wheel control signal. Thus, the road-wheel actuation unit 104 and its related part in controller 106 (road wheel controller) compose the road wheel control system.

FIG. 2 illustrates a control system block diagram for a steer-by-wire control system according to the present invention. It includes a road wheel control system and a steering wheel control system having a two-degree-of-freedom steering wheel model-matching controller. This block diagram illustrates the control system structure of the steer-by-wire system according to this invention.

As shown in FIG. 2, the steering wheel control system 202 receives an equivalent external input torque signal $\tau_d$ generated by the driver upon the steering wheel 108. This equivalent input torque, $\tau_d$, is regarded as a disturbance input signal to the steer-by-wire control system 200.

When the external disturbance torque, $\tau_d$, is applied to the steering wheel control system 202 at the summing junction 300, a reaction torque, $\tau_c$, will be produced to reject the disturbance torque $\tau_d$. The reaction torque, $\tau_c$, is controlled by the steering wheel controller output, $u_s$, which is proportional to the motor reaction torque via motor amplifier 114. As a result of the reaction torque $\tau_c$ acting with the external disturbance torque $\tau_d$, the effective torque of the steering wheel actuator with the electric motor is generated. As shown in FIG. 2, the effective torque, $\tau_m$, is the sum of the external disturbance torque $\tau_d$, and the reaction torque, $\tau_c$, at the summing junction 300; that is $\tau_m = \tau_d - \tau_c$.

The effective torque signal $\tau_m$ is then sent to the steering wheel actuator and assembly block 301 to produce the rotation of the steering wheel. The steering wheel actuator and assembly block 301 includes the actuator 112 with an electric motor, steering wheel 108, and steering column and connecting shaft 116 in the steering wheel unit 102 shown in FIG. 1. The rotation angle of the steering wheel 108 is measured by the steering wheel angle sensor 110 to produce the measured steering wheel angle $\theta_s$. As a feedback signal, the steering wheel angle, $\theta_s$, is sent to the steering wheel controller 206. As a road wheel angle reference signal, the steering wheel angle, $\theta_s$, is also sent to the road wheel control system 204. In FIG. 2, all blocks from control signal $u_s$ through the steering wheel angle $\theta_s$, constitute the steering wheel controlled plant. In other words, the steering wheel controlled plant includes the steering wheel motor amplifier 114, the steering wheel actuator and assembly 301, and the steering wheel angle sensor 110.

The controller 206 provides the control command signal, $u_s$, to produce the steering wheel reaction torque, $\tau_c$, at the steering wheel 108. The controller 206 is a two-degree-of-freedom controller with elements H(s) and F(s) in the form of transfer function description that is designed via a model matching control methodology.

As shown in FIG. 2, there are two elements H(s) 304 and F(s) 306 in the model-matching controller 206 expressed in the form of transfer functions. The input signal for H(s) 304 is the steering wheel angle, $\theta_s$, and the output signal is the control signal, $u_h$, generated by $u_h = H(s) \theta_s$. The input signal for F(s) 306 is the control signal, $u_s$, and the output signal is the control signal, $u_f$, generated by $u_f = F(s)u_s$. The control signals $u_f$ and $u_h$ are then summed at the summing junction 308 to produce the control signal r that is fed negatively to the input terminal of the steering wheel controlled plant at the summing junction 310. The road wheel torque signal from the road wheel control system 204 is used as a reference signal $\tau_r$ and is combined with the feedback control signal r to generate the control signal $u_s$ of the steering wheel controlled plant. The two elements H(s) 304 and F(s) 306 in the model-matching controller 206 need to be determined according to the model-matching control methodology using a required model, which will be described later.

As shown in FIG. 2, the road wheel control system 204 includes a road wheel actuator and assembly 120 with electric motor, a road wheel motor amplifier 122, and a road wheel angle sensor 124. The road wheel controlled plant includes all of these components as shown in FIG. 2. The road wheel controller 318 provides the control signal, $u_r$, to the road-wheel motor amplifier 122 to generate the road wheel control torque $\tau_{rc}$. The torque $\tau_{rc}$ is proportional to the motor current and controller output signal. The actual effective torque, $\tau_{rm}$, is the sum of the control torque, $\tau_{rc}$, and an equivalent road wheel disturbance torque $\tau_f$. The disturbance torque, $\tau_f$, comes from the vehicle dynamics, road conditions, and road wheel actuator and assembly 120. The relationship among the control torque $\tau_{rc}$, the disturbance torque $\tau_f$, and the actual effective torque $\tau_{rm}$ is represented by $\tau_{rm} = \tau_f - \tau_{rc}$ at the summing junction 320. The actual effective torque signal, $\tau_{rm}$, is the input to the road wheel actuator and assembly 120. As represented by line 322, the angular displacement of the road wheel 118 is measured by the sensor 124 to generate the measured road wheel angle. The measured road wheel angle signal $\theta_r$ is then used as a feedback signal and is fed negatively to the summing junction 314 to operate with the road wheel reference signal $\theta_{rf}$. The resultant error signal between the road wheel reference angle, $\theta_{rf}$, and the measured road wheel angle, $\theta_r$, 316, is then forwarded to the road wheel controller 318.

The road wheel controller 318 makes the actual road wheel angle, $\theta_r$, track a desired value, $\theta_{rf}$, set by the driver using the steering wheel 108. In other words, the road wheel controller 318 attempts to minimize the error between the actual road wheel angle $\theta_r$ and the road wheel angle reference signal $\theta_{rf}$.

The road wheel reference signal, $\theta_{rf}$, comes from the steering ratio function block 312. The steering ratio function 312 determines the ratio between the steering wheel angle, $\theta_s$, and the road wheel angle $\theta_r$. The road wheel control system 204 receives the steering wheel angle, $\theta_s$, and directs it to the steering ratio function block 312 to determine the actual road wheel reference signal $\theta_{rf}$. Thus, the output of the steering ratio function block 312 is a road wheel angle reference signal $\theta_{rf}$. The steering ratio function can be a constant value or a function of several other input variables. For example, for a steering ratio of 16, the steering wheel angle changes 16 degree and the resultant road wheel reference angle changes 1 degree.

The control torque signal, $\tau_{rc}$, is also directed to a road wheel torque estimator 324. The road wheel torque estimator 324 generates a signal, $\tau_r$, that is an estimate of the self-aligning road wheel torque that is applied to the road wheel 118. Note that the road wheel torque is an important signal for the steer-by-wire system 200. The road wheel torque changes with the road wheel actuator and assembly, road conditions, vehicle loads, road-tire friction, vehicle dynamics, and external circumstances. The road wheel torque signal can be measured by using sensors or estimated by using estimation strategies in estimator 324. Note that generation of the estimate of the road wheel torque signal can be accomplished by a number of algorithms that are well known in the art.

Figure 3:
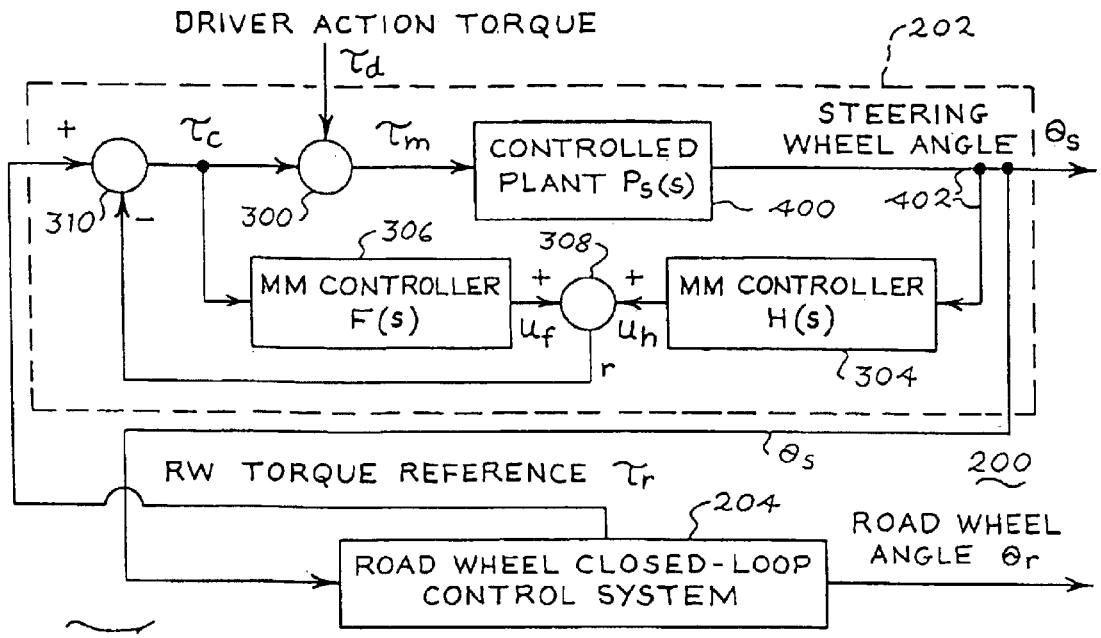
FIG. 3 shows a simplified block diagram of the steer-by-wire control system of FIG. 2.

A simplified block diagram of the proposed steer-by-wire control system based on model matching control strategy is shown in FIG. 3. In this representation, the steering wheel control system 202, is represented in part by a steering wheel controlled plant 400 that is represented by $P_s(s)$ that includes the steering wheel motor amplifier; the steering wheel actuator and assembly; and the steering wheel angle sensor. The steering wheel control system 202, further includes the model-matching controller with two elements H(s) 304 and F(s) 306. In addition, the road wheel closed-loop control system 204 of FIG. 2 is represented by using one block 204 of FIG. 3 which includes the road wheel controlled plant and its controller, the steering ratio function block 312, and the road wheel torque estimator block 324 shown in FIG. 2. The input signal of the road wheel closed-loop control system 204 is the steering wheel angle $\theta_s$ and the output signals are the measured road wheel angle $\theta_r$ and the road wheel torque reference signal $\tau_r$.

Compared with FIG. 2, the output control signal of the model-matching controller, with two controller element H(s) 304 and F(s) 306 in FIG. 3, is directly represented as the steering reaction torque, $\tau_c$, because the actual control output signal, $u_s$, is proportional to the reaction torque $\tau_c$. When the vehicle driver turns the steering wheel, the equivalent external disturbance torque, $\tau_d$, is exerted on the steering wheel control system 202 to produce changes in the steering wheel angle, $\theta_s$, the road wheel angle, $\theta_r$, the road wheel torque reference, $\tau_r$, and the reaction torque, $\tau_c$. The model-matching controller, with H(s) 304 and F(s) 306, receives the changes in $\theta_s$, $\tau_r$ and $\tau_c$, and produces the reaction torque $\tau_c$. The driver holding the steering wheel can feel the reaction torque, $\tau_c$. The reaction torque, $\tau_c$, as the output signal of the model-matching controller, can be manipulated by the model-matching controller. Thus, the requirement for a particular steering feel becomes the model-matching controller design problem.

The model-matching controller also affects the rate of steering wheel return. When the steering wheel is released, the steering wheel will return to the straight-ahead position or a certain angular position with a certain rate. The rate of steering wheel return can be controlled using the model-matching controller. It is obvious that the rate of steering return will be different if the parameters of the model-matching controller are different. Furthermore, because the road wheel reference torque, $\tau_r$, is used as the reference signal to the steering wheel control system, the return rate of the steering wheel and the stop position of the steering wheel will be directly affected by this road wheel reference torque signal.

Figure 4:
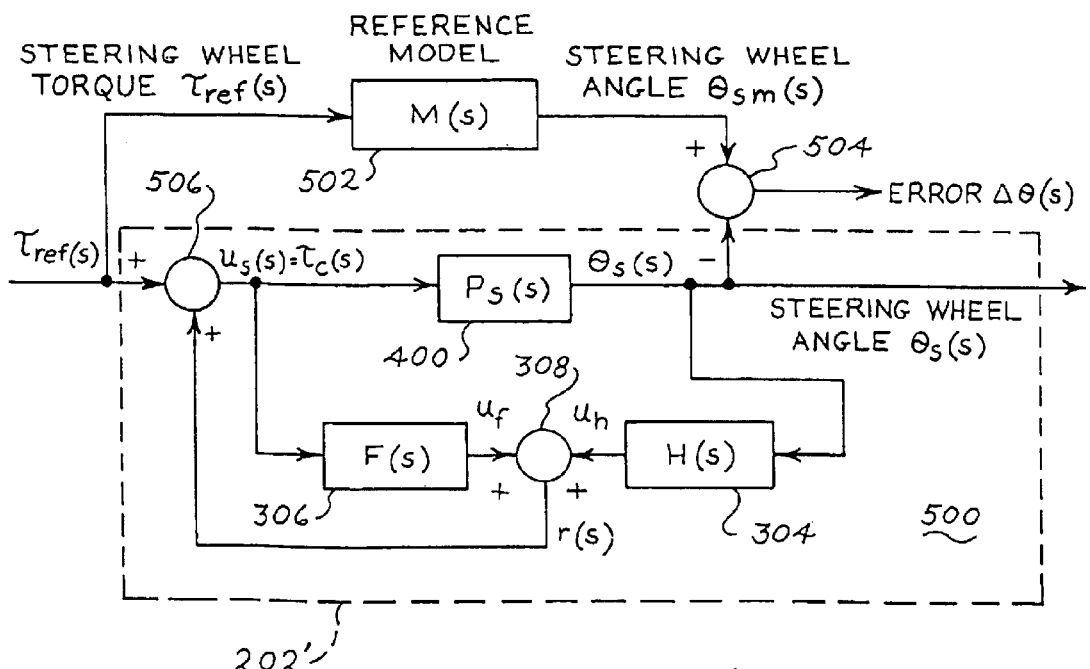
FIG. 4 shows a schematic design block diagram of a two-degree-of-freedom steering wheel controller using a model matching control methodology in accordance with the present invention.

As mentioned previously, the steering wheel controller 206, with two elements H(s) and F(s), needs to be designed according to the model-matching control methodology using a desired or reference model. A schematic block diagram for designing a two-degree-of-freedom steering wheel controller using the model matching control methodology in accordance with the present invention is shown in FIG. 4. The model-matching control design employs a desired or reference steering model that provides the relationship between the steering wheel torque and the steering wheel angle. The basic idea is to determine H(s) and F(s) such that the error between the steering wheel angle output of a reference steering model and the steering wheel angle output of the real steering control system is minimized. This method insures that the reaction torque at the steering wheel follows the desired steering model output torque, and therefore generating the desired "feel" at the steering wheel. It should be pointed out that the dynamics of the road wheel control system is part of the vehicle dynamics. Thus, the required model of the vehicle includes the effect of the road wheel control system.

As shown in FIG. 4, the block diagram representing the model-matching design includes a steering wheel control system 202' that includes a steering wheel controlled plant 400 represented by $P_s(s)$, and the model-matching controller with elements 304 and 306. FIG. 4 further shows a steering reference model 502 that will be "matched" by the steering wheel control system 202'. The steering reference model 502 expressed in the transfer function form, M(s), provides the relationship between the steering wheel torque and the steering wheel angle. Because the steering feel is evaluated generally using the relationship between the steering wheel torque and the steering wheel angle, the model M(s) represents an ideal or desired "steering feel" at the steering wheel. M(s) can be expressed in the form of a transfer function such as $M(s)=(b_2 s^2+b_1 s+b_0)/(a_3 s^3+a_2 s^2+a_1 s+1)$ where the coefficients $\alpha_1$, $\alpha_2$, $\alpha_3$ and $b_0$, $b_1$, $b_2$ are constant coefficients. If the output signal $\theta_s(s)$ of the steering wheel control system 202' matches the output signal $\theta_{sm}(s)$ of the reference model M(s) completely, the steering wheel control system will produce the same steering torque as the output torque of the model. Thus, the vehicle driver will obtain the required steering feel. The model-matching control design requires the determination of F(s) and H(s) according to a certain minimization criterion. The following gives a brief mathematical description of the model-matching strategy and the two-degree-of freedom steering wheel controller design.

As shown in FIG. 4, the control law of model-matching controller is described mathematically by:

$$u_s(s) = \tau_{ref}(s) - r(s) \quad (1)$$

with $$r(s) = F(s)u_s(s) + H(s)\theta_s(s), \quad (2)$$

where F(s) and H(s) are stable transfer functions in the complex s-domain, respectively. The controller output, $u_s$, is proportional to the reaction torque $\tau_c$. Thus, the controller output can be regarded as the steering wheel reaction torqueus $u_s = \tau_c$.

The steering reference model M(s) is described by:

$$\theta_{sm}(s) = M(s)\tau_r(s) \quad (3)$$

where M(s) is a stable transfer function.

The steering wheel closed-loop control system is given by $$\theta_s(s) = H_s(s)\tau_{ref}(s) \quad (4)$$

where $H_s(s)$ is the closed-loop transfer function from the steering wheel torque input to the steering wheel angle output. The closed-loop transfer function, $H_s(s)$, includes the steering wheel control plant, $P_s(s)$, and the two degrees of freedom steering wheel model-matching controller with elements F(s) and H(s) that need be determined.

The objective of the model-matching strategy is to reduce the difference between the reference model, M(s), and the steering wheel closed-loop transfer function, $H_s(s)$, by appropriate selection of F(s) and H(s) using certain criterion. In the model-matching control design different model-matching criteria have been developed. An example is the $H_\infty$ norm-based criterion.

The $H_\infty$ norm-based model-matching control criterion is given by $$\min \|M(s) - H_s(s)\|_\infty \quad (5)$$

where $\| \, \|_\infty$ represents the $H_\infty$ norm. F(s) and H(s) are determined according to the related optimization algorithm such that criterion (5) is satisfied. An example of optimization algorithm is described in the article "Functional Observer and State Feedback for Input Time-Delay Systems" by Y. X. Yao et al., Int. J. Control, Vol. 66, No. 4, 1997, pp. 603–617. When the above criterion is satisfied, the error between the reference model and the closed-loop transfer function is minimized, and transfer functions F(s) and H(s) are obtained. The transfer functions F(s) and H(s) determined by the model matching strategy of FIG. 4 are then applied to the steering wheel control system 202 of a vehicle described previously with respect to FIG. 2.

The dynamics of the vehicle changes with operating conditions under effect of road conditions, vehicle loads, external circumstances and the road wheel actuation system. In particular, the gain of the dynamics of the vehicle changes significantly with vehicle speed (not shown). Thus, the steering model, which is related to the dynamics of the vehicle, should be nonlinear. Using only one linear steering model to determine the controller F(s) and H(s) will result in a controller that is not optimal when the dynamics of the vehicle changes with operating conditions. In order to solve such nonlinear control problem, the gain scheduling strategy can be employed in the model-matching control in the present invention.

Gain scheduling strategy is an effective way of controlling systems whose dynamics change with the operating conditions. It is normally used in the control of nonlinear plants where the relationship between the plant dynamics and operating condition is known. In order to obtain the optimal model-matching controller, several nominal models to various vehicle speeds, can be used to derive the corresponding optimum controller gains for F(s) and H(s). Thus, a gain scheduling control strategy can be employed to vary the controller gains depending on the vehicle operation conditions. By using a gain scheduling strategy, the resulting steering wheel control system can satisfy the model-matching requirements when the dynamics of the vehicle changes with the operating conditions.

In order to obtain an optimal controller, several steering models, corresponding to various operating points, can be used to derive the corresponding optimum model-matching controller gains for F(s) and H(s).

The above described steer-by-wire control system with the model-matching control shown in FIGS. 2–4 provides a variety of advantages. The steering wheel controller has two degrees of freedom instead of one resulting in the decoupling of the steering feel from other desired steering functions. The control system also provides the advantage of introducing additional tuning parameters and provides an environment where the controller parameters, and therefore, various steering performance specifications can be tuned independently. The control system also increases the adjustable range of parameters controlling the steering feel and other steering functions.

The foregoing detailed description is merely illustrative of several physical embodiments of the invention. Physical variations of the invention, not fully described in the specification, may be encompassed within the purview of the claims. For example, other variables of the steer-by-wire system and the vehicle, such as yaw rate and lateral acceleration, can be used as input signals for the model-matching controller based steer-by-wire control system according to the present invention. Accordingly, any narrower description of the elements in the specification should be used for general guidance, rather than to unduly restrict any broader descriptions of the elements in the following claims.

We claim:

1. A steer-by-wire control system, comprising:
 a road wheel actuation control system controlling road wheel angles of a road wheel to track a road wheel reference angle;
 a steering wheel control system producing a steering wheel angle for the road wheel actuation control system, steering feel for a vehicle driver and active steering wheel return; said steering wheel control system further comprising a steering wheel model matching controller that receives an input signal from said steering wheel control system and an input signal from said road wheel control system and generates a control output signal based on a model-matching control law, wherein said control output signal controls reaction torque of said steering wheel control system to produce the steering feel for said vehicle driver and a return rate of a steering wheel or a joystick.

2. The steer-by-wire control system of claim 1, wherein said model matching controller is a two degrees of freedom controller.

3. The steer-by-wire control system of claim 2, wherein said input signal from said steering wheel control system represents a steering wheel angle and said input signal from said road wheel control system represents a road wheel torque.

4. The steer-by-wire control system of claim 3, wherein said model matching controller comprises:
   a first controller element receiving a controller output signal representative of a steering wheel reaction torque signal applied at said steering wheel or joystick and generating a first controller output;
   a second controller element receiving said steering wheel angle input signal representative of a position of said steering wheel and generating a second controller output; and
   said first control output and said second control output are summed to form a controller feedback output signal that is fed to a summing junction to operate with a reference torque signal from a road wheel control system to provide said controller output signal of said model matching controller.

5. The steer-by-wire control system of claim 2, wherein said model matching controller decouples a reaction torque of said steering wheel control system from a return rate of said steering wheel or said joystick.

6. The steer-by-wire control system of claim 1, wherein said road wheel actuation control system receives said road wheel reference angle from said steering wheel control system and controls a direction of a vehicle.

7. The steer-by-wire control system of claim 1, wherein said steering wheel control system further comprises:
   a steering wheel sensor connected to said steering wheel;
   said steering wheel sensor sensing a steering wheel angle signal from said steering wheel; and
   a steering wheel actuator connected to said steering wheel.

8. The steer-by-wire control system of claim 7, wherein said steering wheel, said steering wheel sensor, and said steering wheel actuator are connected to one another by a shaft.

9. The steer-by-wire control system of claim 8, wherein said shaft rotates.

10. The steer-by-wire control system of claim 7, wherein said steering wheel control system further comprises a motor amplifier that receives said control signal from said model matching controller and generates a reaction torque signal, $\tau_c$.

11. The steer-by-wire control system of claim 10, wherein said steering wheel actuator receives an effective torque signal, $\tau_m$, that is the sum of an equivalent external input torque signal, $\tau_d$, and said reaction torque signal, $\tau_c$, that is $\tau_m = \tau_d - \tau_c$.

12. The steer-by-wire control system of claim 11, wherein said equivalent external input torque signal is generated during manual actuation of said steering wheel and said external input torque signal is regarded as an equivalent disturbance input signal to said steering wheel control system.

13. The steer-by-wire control system of claim 12, wherein said steering wheel control system rejects said equivalent external input torque signal, $\tau_d$, to produce said reaction torque signal, $\tau_c$, which a vehicle driver can feel when holding or turning said steering wheel.

14. The steer-by-wire control system of claim 1, wherein said road wheel actuation control system, comprises:
   a road wheel sensor operably connected to said road wheel;
   said road wheel sensor sensing a road wheel angle;
   a road wheel actuator connected to said road wheel; and
   a road wheel controller.

15. The steer-by-wire control system of claim 14, wherein said road wheel actuation control system further comprises a motor amplifier receiving a control signal from said road wheel controller of said road wheel actuation control system.

16. The steer-by-wire control system of claim 15, wherein said road wheel control system comprises:
   a steering ratio element receiving said steering wheel angle input signal and generating a road wheel angle reference signal;
   said road wheel controller receiving an error signal that is formed by subtracting a road wheel angle feedback signal from said road wheel reference angle signal, and said road wheel controller of said road wheel actuation control system sending a signal to said road wheel motor amplifier that generates a road wheel actuator control signal; and
   a road wheel torque estimator receiving said a control signal of the road wheel control system and generating a road wheel torque reference signal.

17. A method of designing a steering wheel model matching controller using a model-matching strategy, comprising:
   providing a reference steering dynamic model that defines a relationship between a steering wheel torque and a steering wheel angle;
   providing a steering wheel control system with a model-matching controller;
   supplying a steering wheel torque as an input for said reference steering dynamic model and said steering wheel control system;
   generating a steering wheel angle as an output of said reference steering dynamic model;
   generating a second steering wheel angle an output of said steering wheel control system;
   matching said steering wheel control system and said reference steering dynamic model using minimization criterions in said model-matching control design; and
   determining said model matching controller by minimizing an error between said reference steering model and said steering wheel control system.

18. The method of claim 17, wherein a control law of said model matching strategy is described by:

$$u_s(s) = \tau_{ref}(s) - r(s)$$

with $$r(s) = F(s)u_s(s) + H(s)\theta_s(s)$$

where F(s) and H(s) are elements of said model-matching controller that are stable transfer functions in a complex domain s, and $u_s$ is a controller output signal, $\tau_{ref}$ is said controller reference input signal and r is controller feedback signal which is related with controller output signal us and steering wheel angle signal $\theta_s$.

19. The method of claim 17, wherein said steering wheel control system is described by $$\theta_s = H_s(s)\tau_{ref}(s)$$

where $H_s(s)$ is a closed-loop transfer function in a complex domain s with the steering wheel angle $\theta_s$ as output and the steering wheel torque $\tau_{ref}$ as input.

20. The method of claim 17, wherein said reference steering model provides a relationship between a steering wheel torque applied to a steering wheel and a steering wheel angle of said steering wheel.

21. The method of claim 20, wherein said steering reference model is described by:

$$\theta_{sm}(s) = M(s)\tau_r(s)$$

where $M(s)$ is a stable transfer function, and $\theta_{sm}$ is said steering wheel angle and $\tau_r$ is said steering wheel torque of the steering wheel model.

22. The method of claim 17, wherein said model matching control strategy comprises applying a model-matching criterion between transfer function $M(s)$ of said reference steering model and a function $H(s)$ of said steering wheel control system such that the following criterion is satisfied $$\min \|M(s) - H_s(s)\|_\infty$$

where $\| \|_\infty$ represents the $H_\infty$ norm and determining $F(s)$ and $H(s)$ according to a related optimization algorithm such that the above criterion is satisfied.

23. The method of claim 17, further comprising performing a gain scheduling model-matching control strategy using different steering models to obtain model matching controller with adjustable gains.

24. The method of claim 23, where said gain scheduling model-matching control strategy comprises changing gains with a speed of a vehicle to compensate for changes in dynamics of said vehicle.

25. The method of claim 23, further comprising producing a variable steering feel by generating a required variable reaction torque at a steering wheel using said gain scheduling model-matching control strategy.

26. The method of claim 17, further comprising decoupling a reaction torque of a steering wheel or joystick from a return rate of said steering wheel or joystick and other steering functions.

27. The method of claim 17, further comprising tuning two tuning parameters of said model-matching controller independently of one another to satisfy a desired steering feel and steering wheel return rate for a steering wheel.

* * * * *